Figure 1:
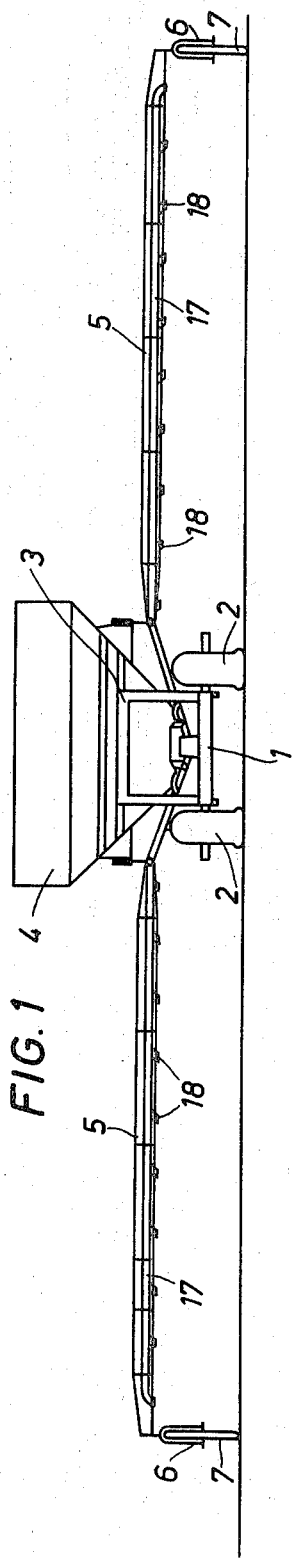
Figure 2:
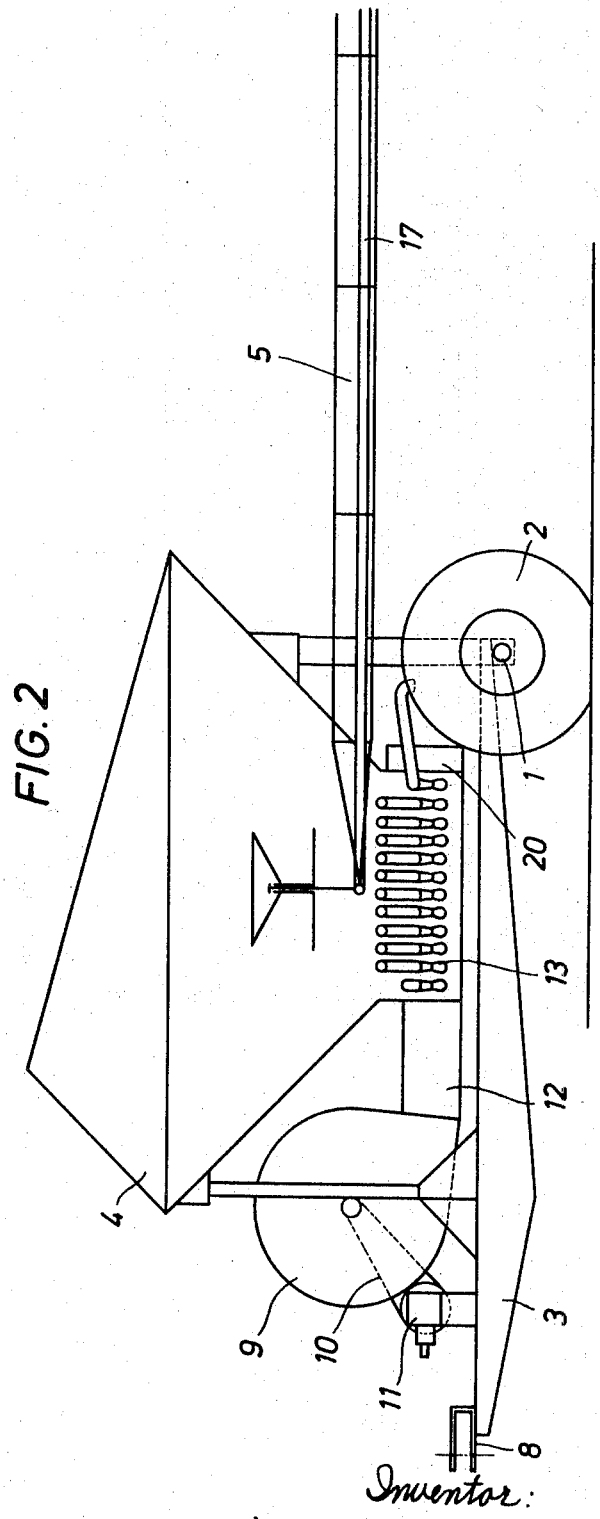
Figure 3:
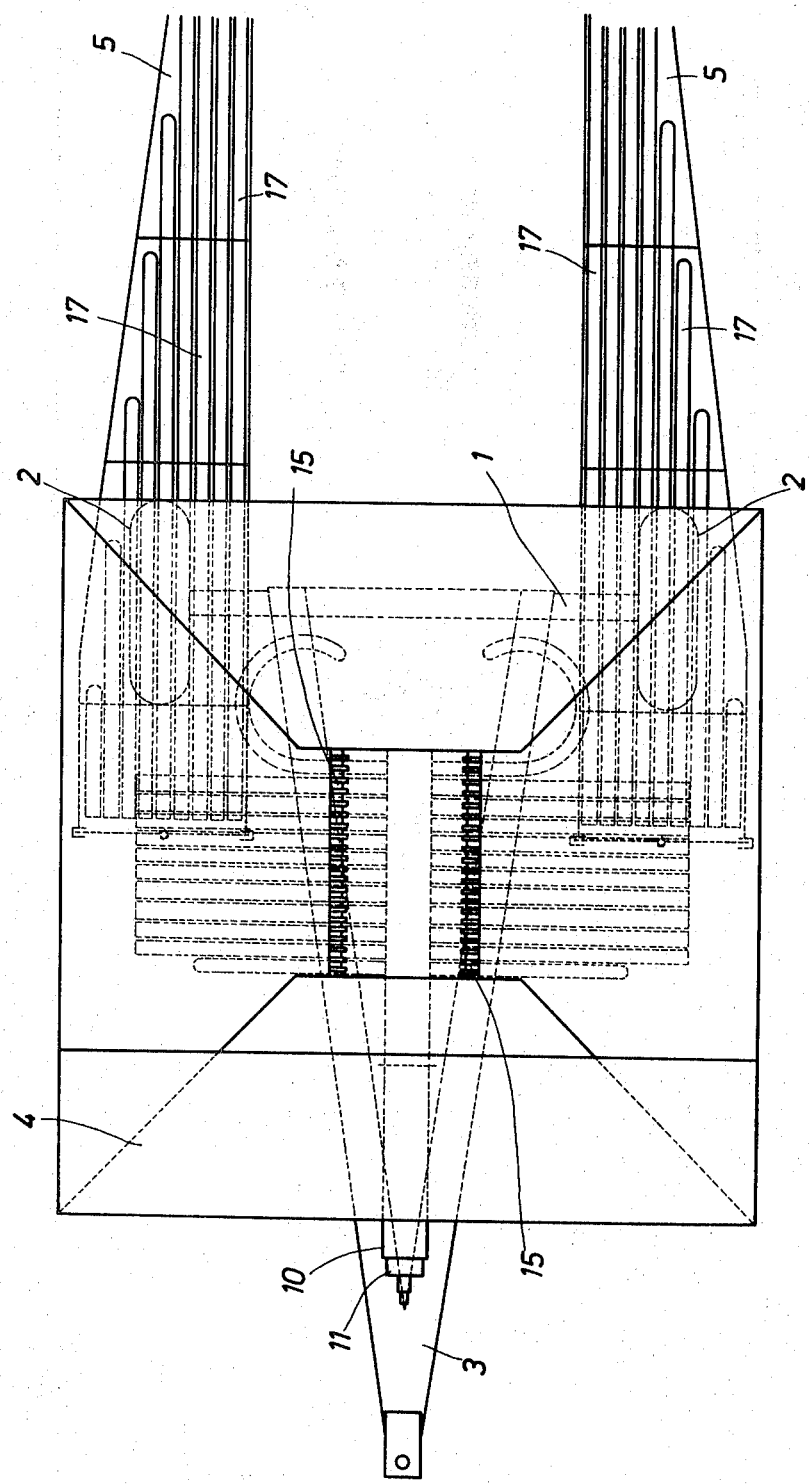
Figure 4:
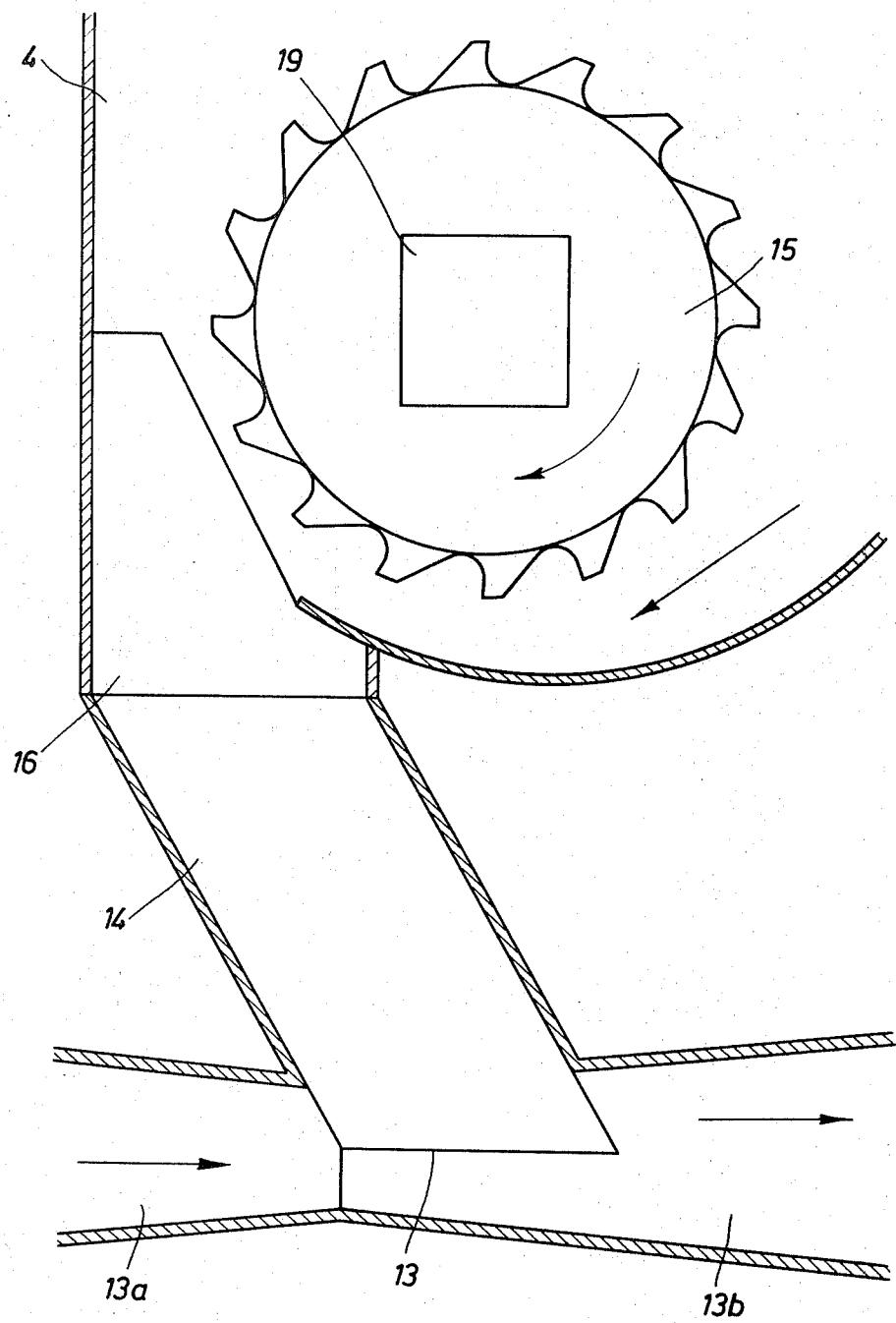
Figure 5:
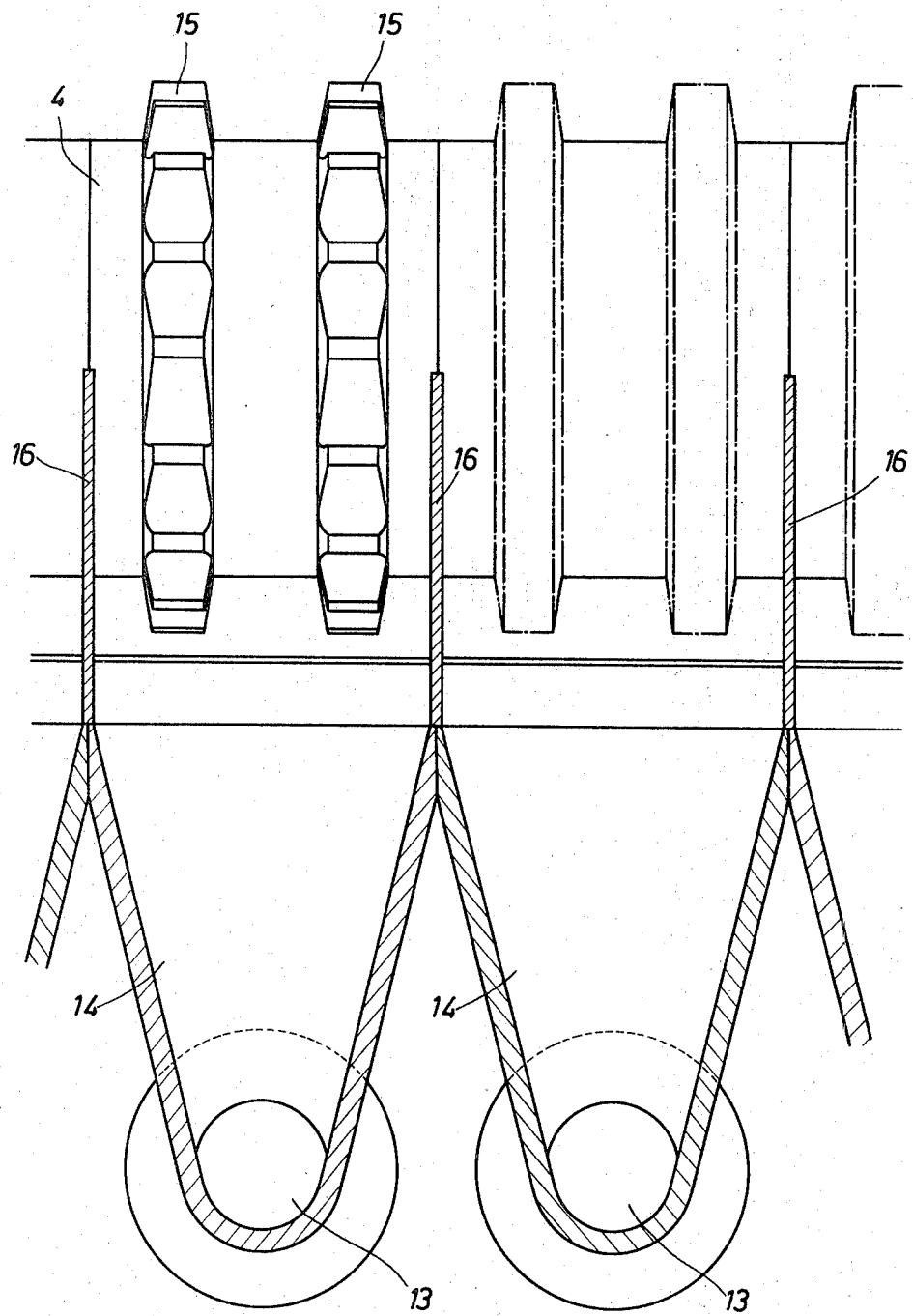

United States Patent

[11] 3,568,937

| [72] | Inventor | Xavier Roger Grataloup<br>Montereau, France |
|---|---|---|
| [21] | Appl. No. | 848,450 |
| [22] | Filed | Aug. 8, 1969 |
| [45] | Patented | Mar. 9, 1971 |
| [73] | Assignee | Societe Anonyme: Nodet-Gougis<br>Montereau, France |
| [32] | Priority | Aug. 14, 1968 |
| [33] | | France |
| [31] | | 163,166 |

[54] SPREADER FOR SPREADING PULVERULENT AND GRANULAR MATERIALS
6 Claims, 5 Drawing Figs.

[52] U.S. Cl. ............................................. 239/655,
302/28, 302/51
[51] Int. Cl. .................................................. A01c 15/04
[50] Field of Search ............................................. 302/28, 51,
57; 239/654, 655, 670

[56] References Cited
UNITED STATES PATENTS

| 1,191,001 | 7/1916 | Hartpence | 302/57 |
| 2,150,767 | 3/1939 | Heim | 239/654 |
| 2,965,379 | 12/1960 | Ganley | 239/654 |
| 3,097,796 | 7/1963 | Festo | 239/167 |
| 3,107,055 | 10/1963 | Palmer | 239/164 |

Primary Examiner—Andres H. Nielsen
Attorney—Baldwin, Wight and Brown

ABSTRACT: The present invention relates to a forced-air spreader for spreading pulverulent or granular material.

This spreader comprises a frame which is adapted to be connected to a tractor and which is mounted on wheels and which carries a hopper adapted to receive pulverulent or granular material and to distribute it through proportioning units of known type to tubes of different lengths mounted on two arms pivotally connected to the hopper, pipe connections being provided whereby, from each proportioning unit, the distributed material passes transversely into the neck of a venturi which at its inlet receives air supplied by a centrifugal fan and which produces, in the respective pipe connection, a suction effect that draws in the said material, this material being entrained by the current of air, being projected out of the venturi with acceleration, and escaping through the respective pivotally mounted tube, which at its end is provided with a deflector or dividing element dispersing the material thus entrained and projected, and the pivotally mounted tubes thus effecting the uniform distribution of the material over the ground.

PATENTED MAR 9 1971

3,568,937

SHEET 1 OF 4

Inventor:
Xavier Roger Grataloup
BY Baldwin Wight Diller & Brown
Attorneys

SPREADER FOR SPREADING PULVERULENT AND GRANULAR MATERIALS

The present invention relates to a forced-air spreader for spreading pulverulent or granular material.

With the improvement of productivity in agricultural work there is a demand for spreaders for spreading pulverulent or granular material which meet the following criteria:

1. They must work over very great widths.
2. They must ensure the requisite accuracy in the proportioning of the material to be spread and they must ensure good distribution of this material over the ground.
3. They must enable the size of the spreading implement to be easily reduced for transportation or for parking elsewhere than in a field.
4. They must be able to spread pulverulent materials as well as granular materials.

The screw-type distributors, disc-type distributors and moving-bottom-type distributors which are already known have distribution widths equal to the implement width, so that their distribution width is rather limited.

Moreover, the width of these implements cannot be reduced when the implement is idle, and the task of loading their hoppers, which are very long, does not really suit the ordinary type of loading means (i.e. a tipping hopper, Archimedean screw, or conveyor belt).

The so-called centrifugal distributors do meet the first of the above criteria, and their dimensions are quite small, but since they work by projecting the material centrifugally the regularity of their spreading is by no means perfect. Their spreading regularity is in fact generally considered by users to be inadequate, and because they do depend upon centrifugal projection these implements are unsuitable for use in the spreading of pulverulent fertilizers.

It is an object of the present invention to provide an implement that meets all four of the above criteria.

According to the present invention, a spreader for spreading pulverulent or granular material comprises a frame which is adapted to be connected to a tractor and which is mounted on wheels and which carries a hopper adapted to receive pulverulent or granular material and to distribute it through proportioning units of known type to tubes of different lengths mounted on two arms pivotally connected to the hopper, pipe connections being provided whereby, from each proportioning unit, the distributed material passes transversely into the neck of a venturi which at its inlet receives air supplied by a centrifugal fan and which produces, in the respective pipe connection, a suction effect that draws in the said material, this material being entrained by the current of air, being projected out of the venturi with acceleration, and escaping through the respective pivotally mounted tube, which at its end is provided with a deflector or dividing element dispersing the material thus entrained and projected, and the pivotally mounted tubes thus effecting the uniform distribution of the material over the ground.

The fan may be driven by the power takeoff of the tractor.

The proportioning units may be of a rotary type and may be driven by the land wheels of the implement through a gearbox, or other variable-speed drive, so that the output of these units can be suited to the rate of advance of the implement over the ground.

Partitions or screens are preferably provided to separate the proportioning units from one another and to divide the output from these units between the tubes carried by the pivotally connected arms.

The pivotally connected arms are preferably adapted to be folded towards the rear to facilitate transportation of the implement from one site to another.

Preferably the frame of the implement has an axle which is adjustable in length so that the track of the implement wheels can be suited to the width of the tractor.

One embodiment of the invention will now be described, by way of example only and without limitation, with reference to the accompanying drawings, in which:

FIG. 1 is a rear view of the implement in its working position,

FIG. 2 is a corresponding side view,

FIG. 3 is a corresponding top view,

FIG. 4 is a fragmentary side view of a proportioning unit, and the venturi fed by it, on a larger scale, and FIG. 5 is a fragmentary view showing a proportioning unit, again on a larger scale and partly in section, looking along the venturi axes.

As shown in FIG. 1, the implement comprises an axle 1 carrying two land wheels 2 and adapted to be varied in length, to permit adjustment of the implement wheel track to suit the width of the tractor.

A frame 3 carrying a hopper 4 for pulverulent or granular material is mounted on the axle 1.

On each side of the hopper 4 there are pivotally mounted two arms 5, each of which is carried at its end by a pivotally mounted fork 6 running on a wheel 7; the arms 5 can thus either be brought into a position at right angles to the direction in which the implement is to move when in use, or be folded parallel to that direction for transportation or parking of the implement.

As will be seen from FIG. 2, the frame 3 can be connected to a tractor (see 8) by any usual means.

On the frame 3 there is mounted a centrifugal fan 9 driven by a belt 10 from the output shaft of bevel gearing 11 driven through a universal joint on the power takeoff of the tractor. The fan 9 feeds a wind box 12 feeding two series of venturis 13, of which there is one series on each side of the hopper 4.

As shown in FIGS. 4 and 5, each venturi 13 receives air from the wind box 12 through an inlet pipe **13*a*, and receives pulverulent or granular material through a transverse pipe 14 leading into the neck of the venturi. The pipe 14 leads from a proportioning unit 15** of known type, with either grooves or studs, as at present in use in seed metering sowing devices.

The proportioning units 15 are situated at the base of the hopper 4 and are separated from one another by partitions 16, which divide the output of the units 15 into equal portions, distributed between the respective venturis.

The outlet pipes **13*b* of the venturis 13 are connected to tubes 17 of different lengths, carried by the arms 5. At the end of each tube 17 there is a deflector or divider 18** to ensure good distribution of the pulverulent or granular material over the ground.

The proportioning units 15 rotate on shafts 19 driven through a gearbox or other variable-speed drive 20 from the wheels 2.

The implement functions in the following manner.

When the implement has been connected to and is being towed by a tractor, the wheels 2 drive the proportioning units 15 through the gearbox or other variable-speed drive 20. This makes it possible to ensure a flow of pulverulent or granular material proportional to the rate of advance of the implement over the ground. By changing the ratio of the gearbox or other variable-speed drive 20, it is possible to adjust the amount of pulverulent or granular material, e.g. fertilizer which is spread per hectare or per acre.

The pulverulent or granular material passing out of the proportioning units 15 drops to the level of the neck of the respective venturi 13, the partitions or screens 16 directing the output of each proportioning unit to the appropriate pipe 14 leading to the respective venturi as previously indicated.

The fan 9, driven from the power takeoff of the tractor, blows air into the wind box 12, which distributes it between the various venturis 13. The latter produce, in the pipes 14, a slight suction effect which facilitates the descent of the pulverulent or granular material and eliminates any possibility of an upward airstream. This arrangement makes it unnecessary to provide airtight sealing means acting between the higher pressure end of the tubes 17 and the outside.

At the level of the neck of each venturi 13 the higher air speed accelerates the pulverulent or granular material in the pipe 13*b* of the venturi.

At the end of each tube 17 the deflector or divider 18 distributes the pulverulent or granular material uniformly over the ground. By correctly proportioning the material reaching these deflectors there can thus be obtained perfect distribution of the material over the working width.

To transport the implement from one site to another, the two arms 5 are folded towards the rear, the wheels 7 aligning themselves substantially behind the wheels 2.

Various modifications to the general form and detailed arrangement of the above-described implement may naturally be made without thereby departing from the scope of the invention.

I claim:

1. A forced air spreader for spreading particulate material, comprising: a frame mounted on wheels and adapted to be connected to a tractor; a hopper which is carried on the frame and which is adapted to receive particulate material; rotary proportioning units fed from the hopper; tubes of differentiated lengths disposed on two arms pivotally connected to the hopper; a series of pipe connections and a series of venturis, a pipe connection leading from each proportioning unit into the neck of a venturi; a centrifugal air blower whose outlet communicates with the inlets of the venturis, whereby in each pipe connection there is produced a suction effect drawing forth the particulate material, which is entrained by the air current in the venturi and projected out of the venturi at accelerated speed into one of the tubes of differentiated lengths; and guiding means disposed at the outlets of the tubes of differentiated lengths whereby the material entrained in and projected from the venturis is distributed uniformly over the ground.

2. A spreader as set forth in claim 1, in which the fan is provided with drive means adapted to be connected to a tractor power takeoff.

3. A spreader as set forth in claim 1, in which the rotary proportioning units are driven by the wheels of the spreader through a variable-speed drive whereby the output of the proportioning units can be adjusted with respect to the rate of advance of the spreader over the ground.

4. A spreader as set forth in claim 1, which further comprises screens which separate the proportioning units from one another and divide the output of the proportioning units between the tubes of differentiated lengths.

5. A spreader as set forth in claim 4, in which the arms pivotally connected to the hopper are adapted to be folded to the rear of the spreader, whereby the spreader is prepared for transportation.

6. A spreader as set forth in claim 1, in which the frame comprises an axle of adjustable length, whereby the spreader wheel track can be adjusted in accordance with the width of a tractor to which the spreader is connected.